United States Patent [19]
Hammer

[11] Patent Number: 5,138,321
[45] Date of Patent: Aug. 11, 1992

[54] METHOD FOR DISTRIBUTED DATA ASSOCIATION AND MULTI-TARGET TRACKING

[75] Inventor: Jonathan B. Hammer, Rockville, Md.

[73] Assignee: International Business Machines Corporation, Armonk, N.Y.

[21] Appl. No.: 776,963

[22] Filed: Oct. 15, 1991

[51] Int. Cl.$^5$ .............................................. G01S 13/91
[52] U.S. Cl. ...................... 342/36; 342/59; 342/96
[58] Field of Search ..................... 342/36, 59, 95, 96

[56] References Cited

U.S. PATENT DOCUMENTS

| | | | |
|---|---|---|---|
| 2,825,054 | 2/1958 | Ernst | 342/36 X |
| 3,109,170 | 10/1963 | Green, Jr. et al. | 342/36 |
| 3,434,140 | 3/1969 | Chisholm | 342/36 |
| 3,821,751 | 6/1974 | Loos | 342/59 |
| 3,952,304 | 4/1976 | Broniwitz et al. | 342/95 |
| 4,062,012 | 12/1977 | Colbert et al. | 342/95 X |
| 4,072,943 | 2/1978 | Miller . | |
| 4,550,318 | 10/1985 | Prengaman et al. . | |
| 4,621,267 | 11/1986 | Wiley . | |
| 4,768,034 | 8/1988 | Preikschat et al. . | |
| 4,806,936 | 2/1989 | Williams et al. . | |

OTHER PUBLICATIONS

Yaakov Bar-Shalom, "Tracking Methods in a Multitarget Environment," *IEEE Transactions on Automatic Control*, vol. AC-23, No. 4, Aug. 1978, pp. 618-626.

"9th Workshop on C$^3$ Systems," Laboratory for Information & Decision Systems, Massachusetts Institute of Technology, Cambridge, Mass., pp. 65-68.

Samuel S. Blackman, "Multiple Target Tracking with Radar Applications", Chapter 13, Artech House, Norwood, Mass., 1986.

*Primary Examiner*—T. H. Tubbesing
*Attorney, Agent, or Firm*—Mark A. Wurm

[57] ABSTRACT

A technique is disclosed for multiple sensor tracking which distributes data association and filtering processing among multiple processing entities but coordinates the track estimates such that track states and covariances represent the equivalent of a centralized estimate. The object of the invention is to establish and maintain a single system track for a single aircraft in a distributed processing environment. This is achieved through communication of track information among processing entities which process a single sensor's inputs. Continued updating and re-broadcasting of process data are performed between the multiple sensor's processing entities.

4 Claims, 5 Drawing Sheets

FIG. 2(b)
*PRIOR ART*
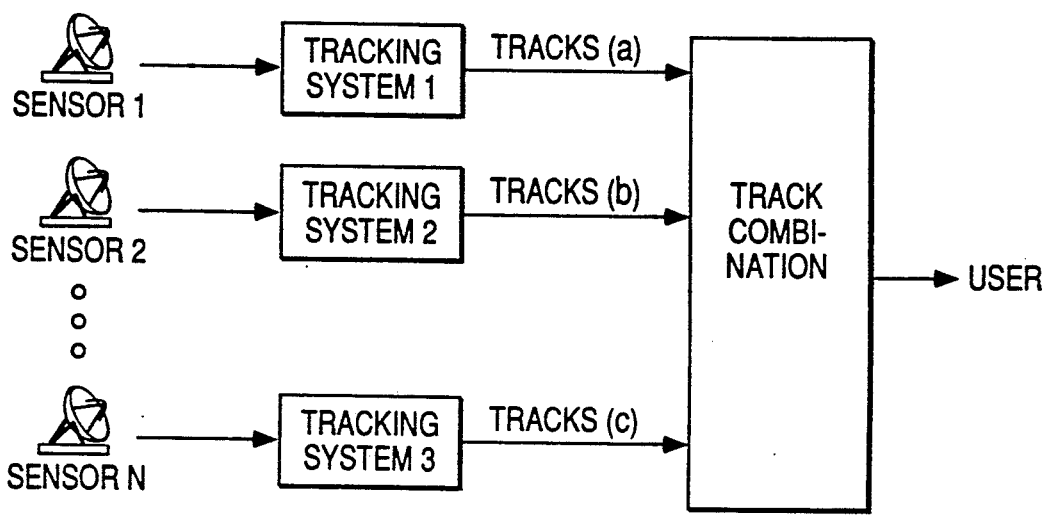
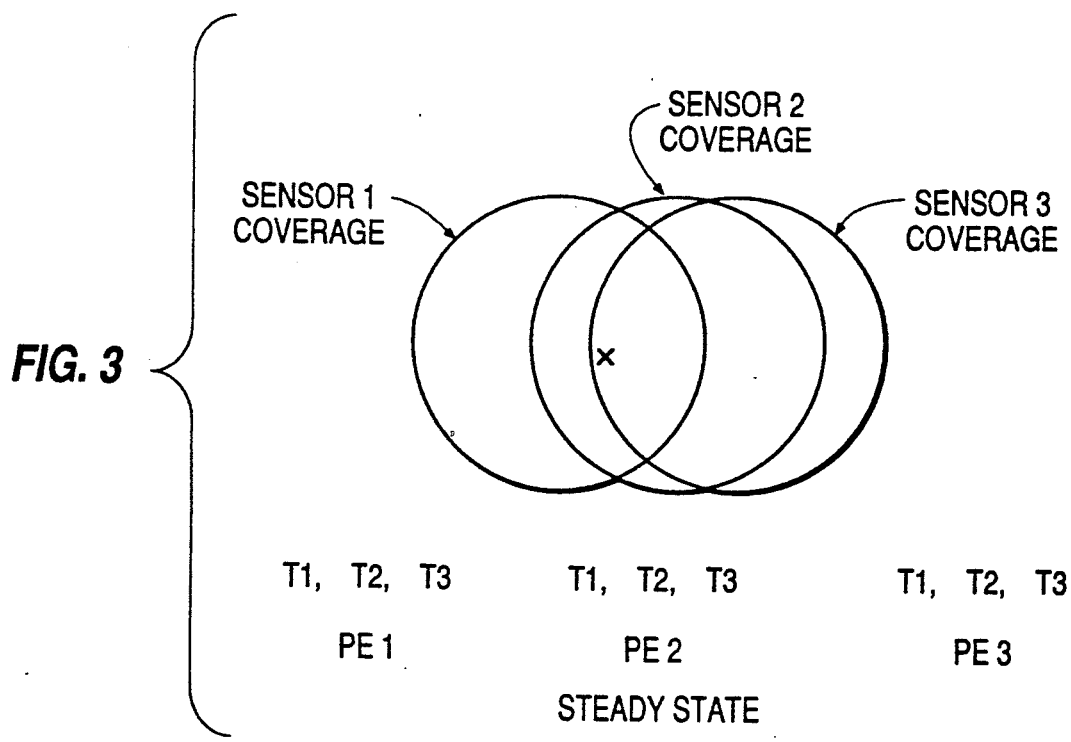
FIG. 3

METHOD FOR DISTRIBUTED DATA ASSOCIATION AND MULTI-TARGET TRACKING

This invention was made with Government support under Contract Number DTFA01-88-C-00042 awarded by the Federal Aviation Administration. The Government has certain rights in this invention.

BACKGROUND OF THE INVENTION

1. Technical Field

The invention disclosed generally relates to multiple target tracking radar systems which determine the states of individual objects in a clutter environment.

2. Background Art

The present invention is intended for the real time tracking of moving objects in a clutter environment, such as for the purpose of traffic control of aircraft within an air space. The invention is a technique for multiple sensor tracking which distributes the track processing among multiple processing entities, but co-ordinates the track estimates such that the track states and covariances represent the equivalent of a centralized estimate. In the prior art three basic modes of tracking were available: centralized, single sensor distributed, and combined.

In centralized tracking shown in the prior art of FIG. 1, all sensor data is fed to a central processor. This method is particularly vulnerable to processor failure. However, it produces accurate results because all sensor measurements are used in a close to optimal fashion.

In a sensor level tracking system, the outputs shown in prior art FIG. 2a are available to the user. This method is not as vulnerable to processor failure as a centralized tracking design. This is because in the event of any one sensor or tracking system failure, tracking outputs may be derived from a different sensor with overlapping coverage. However, sensor level tracking does not provide tracking outputs which are as accurate as a centralized design.

In a combined tracking system shown in prior art FIG. 2b, each sensor processor forms a sensor level track. These tracks are then combined at a central processing entity. This method is less vulnerable to processor failure because of the redundancy in the sensor level processors (although the method is still vulnerable to central processor failure). The method also achieves the accuracy of a centralized design. However, the method is computationally expensive since both the sensor level and central processors must be supported, as well as the data communications between the sensor level and central level processors.

What is needed is a method of multiple sensor tracking which is entirely distributed, allowing for better overall tracking system reliability. If any one processing entity or sensor fails, the tracking process should be able to continue. The tracking system should take full advantage of all available sensor inputs for high accuracy. Finally, the communications and processing complexity should be at least as low as for that of sensor level tracking.

The present invention achieves these objectives. That is, the invention fully distributes track processing and produces results which are equivalent in accuracy to results derived from a centralized multiple sensor tracking system. The complexity of the design is low because the computations are entirely distributed.

Definitions

State: Represents the condition of a given system or object. Defined as a vector; In a Cartesian representation of a two dimensional Newtonian dynamic system, for example, the state, x, may have six components: x=[X Y X' Y' X" Y"] where X is the X position, Y is the Y position, X' is the X component of the velocity, Y' is the Y component of the velocity, X" is the X component of the acceleration, Y" is the Y component of the acceleration.

Covariance: Represents the uncertainty in the state estimate, and is defined as the second moment of the expected value of the state minus the expected value of the state:

$$R = E\{(x - E[x])(x - E[x])^t\}$$

Where X is the state vector consisting of one or more components, R is the covariance matrix, and t represents the transpose operator.

Reference

Samuel S. Blackman, "Multiple Target Tracking with Radar Applications," ARTECH House, 1986, contains general background information on target tracking, the teachings of which are incorporated herein by reference.

OBJECTS OF THE INVENTION

An object of the invention is to establish and maintain a single system track for a single aircraft in a distributed processing environment. This object is achieved through the communication of track state and covariance information among processing entities. Each processing entity processes a single sensor's observations for a given track.

SUMMARY OF THE INVENTION

To achieve the foregoing objects in accordance with the purposes of the invention as embodied and broadly described herein, a method has been developed for multiple sensor tracking of objects which distributes the data association and track filtering functions among multiple processing entities but coordinates the track estimates such that the track states and covariances represent the equivalent of a centralized estimate. The invention establishes and maintains a single system track of a single object in a distributed processing environment. This is achieved via the communication of track information among processing entities which each process a single sensor's observations.

The multiple target tracking system receives a target report from a sensor to a processing node, associates the target report with a specific track, updates the track's state and covariance, and broadcasts the track's state and covariance to the other processor nodes. The other nodes receive the broadcast track state and covariance information and replace their present track state and covariance with the newly received broadcast information. The newly updated track state and covariance is then available at all nodes for the purposes of continued data association and multiple sensor track state and covariance updates.

BRIEF DESCRIPTION OF THE DRAWINGS

The accompanying drawings which are incorporated in and constitute a part of the specification, illustrate a preferred embodiment of the invention and together with a general description of the invention given and a detailed description of the preferred embodiment given below serve to explain the principle of the invention.

FIGS. 2a and 2b are prior art illustrations of sensor level and combined tracking systems.

FIG. 3 shows a steady state three sensor tracking system with overlapping coverage.

DETAILED DESCRIPTION OF THE INVENTION

The invention is implemented in multiple processing entities. The processing entities may be individual physical processors, parallel processors invoked in a single, physical processing unit, or time shared processes invoked in a single physical processor. The invention can be implemented in any one or a combination of the above manners.

Figure 4:
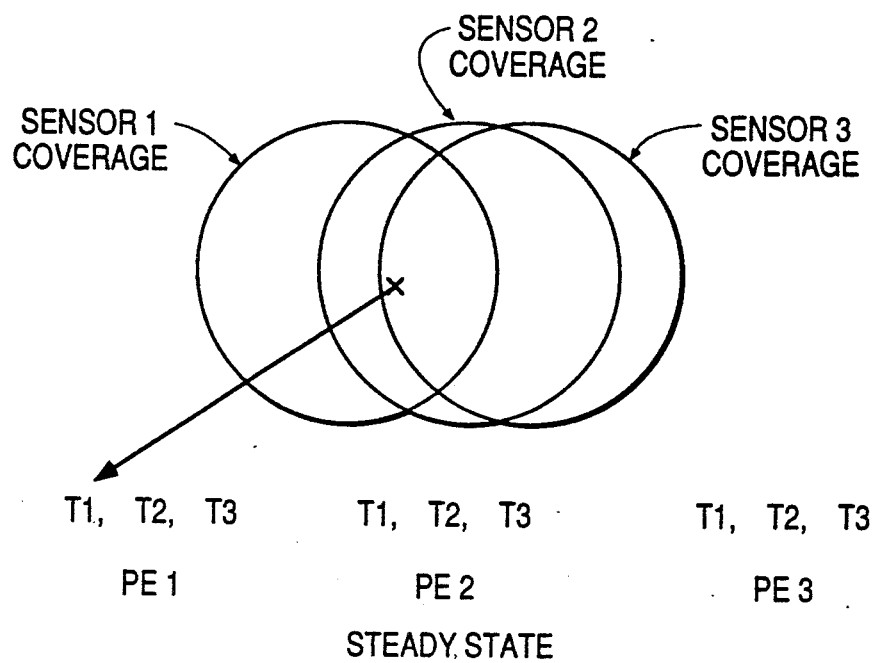
FIG. 4 shows the target corresponding to track 1 derived by the processing entity 1.
Figure 5:
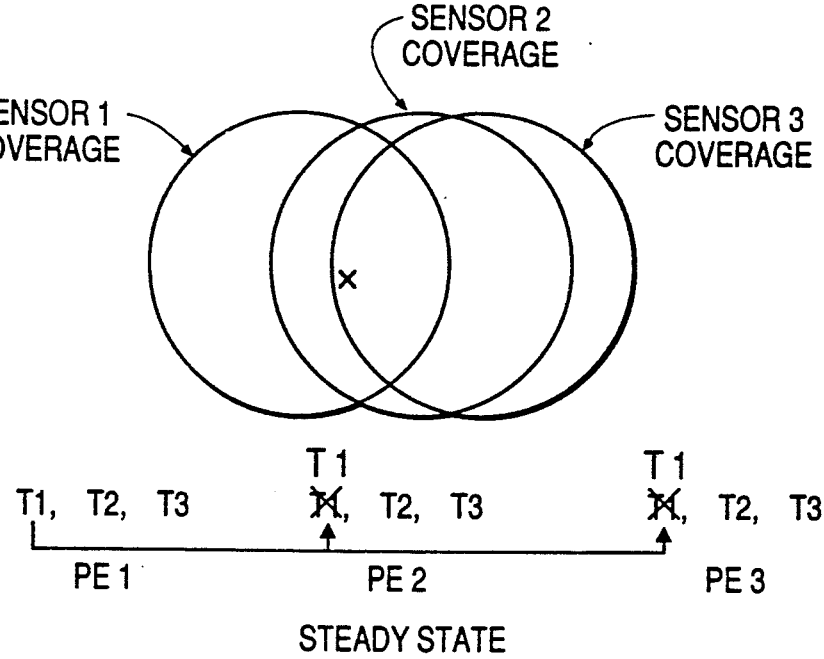
FIG. 5 shows the processing entity's update to track 1 broadcast to the remaining sensors.

The invention details can be best illustrated by example. Shown in FIG. 3 is a case of three overlapping sensors and three tracks. Each processor processes the data in the corresponding sensor's coverage area. Assume that in the overlapping area, there are three tracks identified as T1, T2 and T3. Also assume that an identical copy of the state and covariance estimates is contained in each processing unit. Suppose that the next target report received in the system is reported from sensor 1 as shown in FIG. 4. This target report is to be processed by processing entity (PE) 1. The target report is processed through the data association function and is associated to track 1 as illustrated in FIG. 5.

Figure 6:
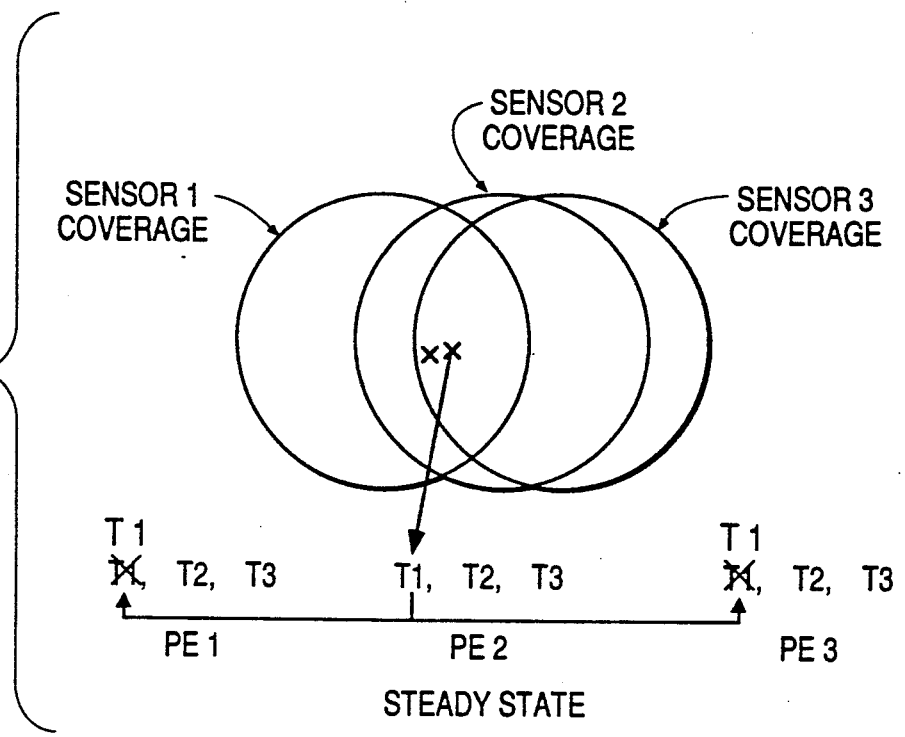
FIG. 6 shows the target correlation to track 1, processing entity 2 and its re-broadcast.

After data association, the target is filtered through a smoothing algorithm. For example, a Kalman filter could be used. The track state and covariance for track 1 is updated. Next, the track state and covariance are broadcast to the remaining sensors within the system. PE 2 and PE 3 receive the updated track state and covariance, and replace their old versions of these estimates with the received estimates. This process is illustrated in FIG. 6. At this point in the process, all three PEs have identical state and covariance estimates for track 1.

Now suppose PE 2 next receives a target report for track 1. PE 2 associates the report to track 1, updates the track state and covariance estimates, and broadcasts the results. PE 1 and PE 3 receive the new state and covariance estimates and replace their versions with the received versions. Again, all PEs have identical state and covariance estimates for the track. This step in the process is illustrated in FIG. 6.

The process continues indefinitely in a similar manner. The results are track state estimates which contain contributions from all sensors with which the tracks are observed.

An important issue arises with regard to timing. It is possible for two PEs to update a single track at approximately the same time. This can result in two state and covariance estimates entering the system at approximately the same time. If the timing of the communications are such that receipt of the updates occurs at different times for different PEs, it is possible for two different state and covariance estimates to exist in the system for a single track.

To eliminate this problem, each PE monitors the times at which it receives external updates for each track. If two updates occur within a specified parameter of time of each other, then a selection rule is applied. This rule could, for example, compare the sum of the squares of the velocity covariance of the two updates. The track update with the lower covariance could be retained, while the track update with the higher covariance is discarded.

Another potential confusing situation arises during track initiation. If a new object appears in an overlapping coverage area, it is possible for two or more PEs to simultaneously initiate a track on the aircraft. This would result in the existence of two tracks in the system for a single aircraft—precisely the situation which the logic is intended to prevent.

Figure 7:
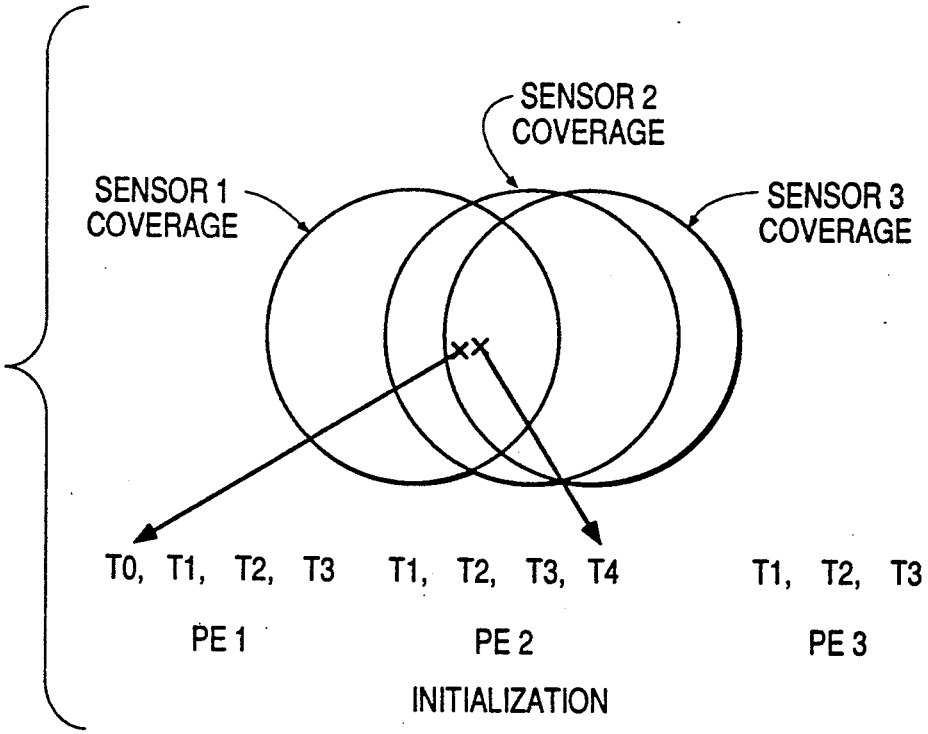
FIG. 7 shows sensors 1 and 2 simultaneously initiating new tracks.

The problem and its resolution is again best illustrated by example. As in FIG. 3, assume that the three sensors numbered 1 through 3 are serviced by PEs numbered 1 through 3. Also assume that a new object is observed simultaneously by PE 1 and PE 2. PEs 1 and 2 initiate new tracks on the object identified as T0 and T4, respectively. This situation is illustrated in FIG. 7.

Figure 8:
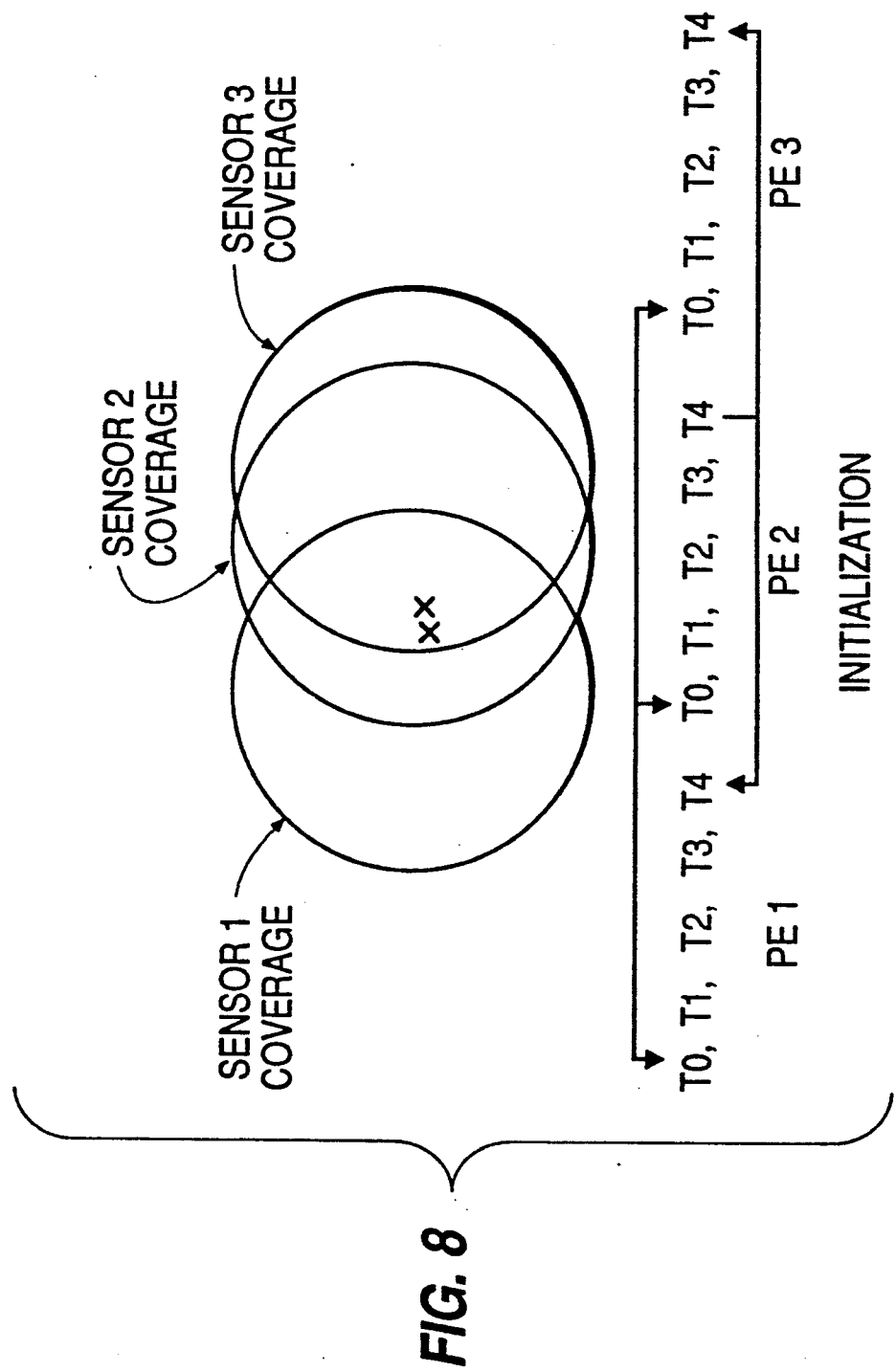
FIG. 8 shows how new tracks are communicated within the processing entities.

Both PE 1 and PE 2 proceed to broadcast the newly initiated tracks, resulting in the situation diagrammed in FIG. 8. At this point, there are two tracks in each PE for a single aircraft.

To resolve the problem, logic is needed which identifies the situation. This logic is called "track fusion." Track fusion recognizes that more than one track is from the same aircraft, and merges the information from the two tracks. The track fusion function is executed in a processing entity when it receives a track which is in its area of interest, but which is not currently in its track data base. When such a track is received, it is placed into a special class. The track enters the track fusion function, and is not allowed to enter the local target to track correlation process until the track fusion process is complete. This important rule keeps the new track from competing for target reports with a possibly already existing track. In addition, this rule allows a better comparison of the new track to existing tracks by keeping the track state estimates reasonably independent.

The function of the track fusion algorithm is to recognize the existence of duplicate tracks and to merge them. There are many different possible techniques which can be used to provide the track fusion function. These techniques can be based upon either a Bayesian or Dempster-Shafer (evidential reasoning) methods, for example (See Blackman, Chapter 13). A technique used in the Air Traffic Control environment is a sequential decision scheme based on a cumulative statistical distance of the two tracks. The decision to merge two tracks is based on a state comparison scheme using as the underlying metric the statistical distance between state vectors.

Figure 1:
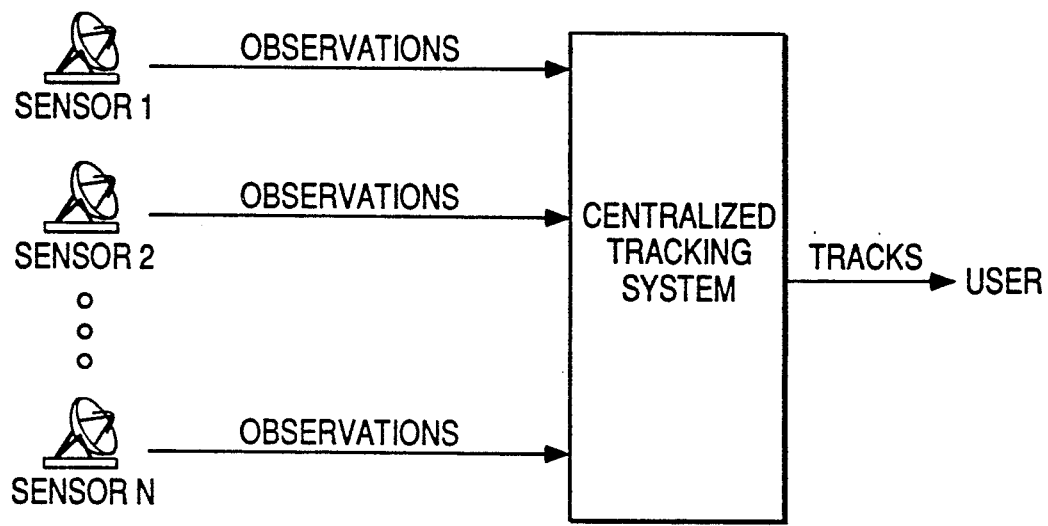
FIG. 1 is a prior art figure of a centralized level tracking system.
Figure 2A:
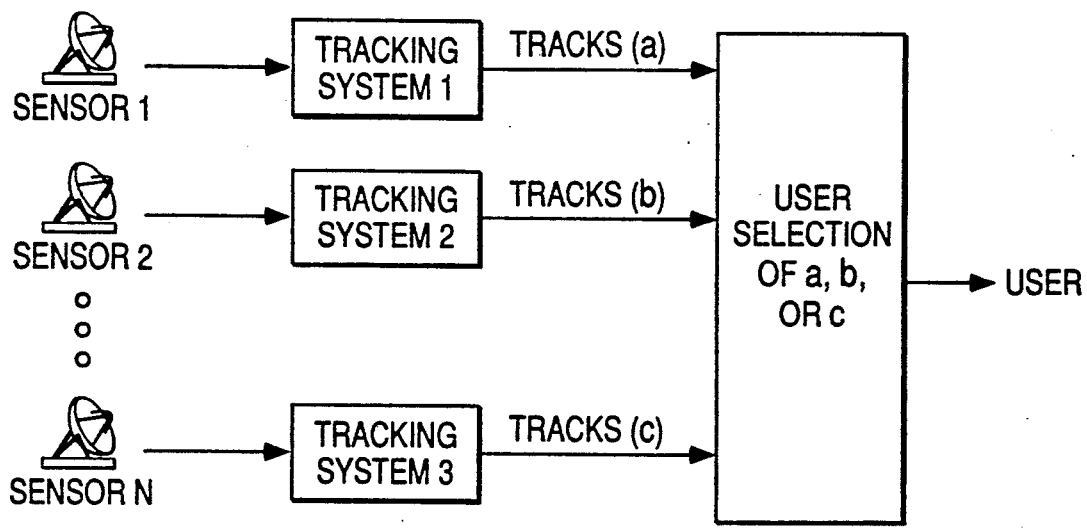

The track fusion logic is not the subject matter of this invention disclosure; however, its use in the context of the distributed track processing is novel. In the design of this invention, the track fusion function is not used continuously. Once two tracks are merged through the track fusion function, they become a single system track. This single system track is then used in the data association and track filtering functions. In the design there is no need to continue to maintain the fusion processing of tracks once they are fused. Thus, the resources which need be devoted to track fusion processing are smaller than those needed for the general track combination process (prior art FIG. 2).

Additional advantages and modifications will readily occur to those skilled in the art. The invention in its broader aspects is therefore not limited to the specific detailed examples described. Accordingly, departures may be made from such described details without departing from the spirit or scope of the general inventive concept disclosed and claimed herein.

What is claimed is:

1. A method of multi-target tracking objects within a processing system having a plurality of processing nodes, comprising the steps of:

receiving a target report from a processing node;
  processing the target report to correlate it with a specific track;
  updating the track state and covariance;
  broadcasting the track and covariance to other processor nodes;
  receiving the broadcast tracking and covariance information within said other processes nodes; and
  replacing the present tracking and covariance information with the broadcast information.

2. The method of claim 1 wherein the processing step includes applying a target selection rule to correlate a sensor signal to a specific track.

3. The method of claim 1 wherein the processing step includes applying a track fusion algorithm to correlate a sensor signal to a specific track.

4. In an air traffic control system, having a plurality of radar stations for detecting a plurality of aircraft, a method of tracking aircraft within a location comprising the steps of:

receiving a report of aircraft from a radar station;
  processing the aircraft report to correlate it with a specific aircraft track;
  updating the aircraft track state and covariance;
  broadcasting the aircraft track and covariance to other radar stations;
  receiving the broadcast aircraft tracking and covariance information within said other radar stations; and
  replacing the present aircraft tracking and covariance information with the broadcast information.

* * * * *